United States Patent
Goldstein et al.

[15] 3,655,488
[45] Apr. 11, 1972

[54] APPARATUS FOR JOINING SHEET MATERIAL

[72] Inventors: Milton Goldstein, Yonkers, N.Y.; George R. Hair, Clifton, N.J.; Jack Kutzenco, Westfield, N.J.; Jacques J. Marchand, Newark, N.J.

[73] Assignee: Bondit Corp., Rahway, N.J.

[22] Filed: June 18, 1969

[21] Appl. No.: 871,158

Related U.S. Application Data

[62] Division of Ser. No. 653,787, July 7, 1967, Pat. No. 3,575,760.

[52] U.S. Cl..............................156/380, 156/320, 156/549
[51] Int. Cl......................................B29c 27/10, B65c 11/06
[58] Field of Search..................156/380, 580, 583, 549, 550, 156/273, 274, 320

[56] References Cited

UNITED STATES PATENTS

| 2,941,576 | 6/1960 | Schenicengel | 156/583 X |
| 3,037,868 | 6/1962 | Rosser | 156/550 UX |
| 3,378,430 | 4/1968 | Aizawa | 156/274 X |
| 3,505,136 | 4/1970 | Attwood | 156/380 X |
| 3,143,456 | 8/1964 | McGrath et al. | 156/320 X |

*Primary Examiner*—Benjamin A. Borchelt
*Assistant Examiner*—J. J. Devitt
*Attorney*—Ryder, McAulay & Hefter

[57] ABSTRACT

A method and apparatus for joining sheet material is disclosed in which the material to be joined is fed from supply rolls, a dry monofilament adhesive is interfed between the materials in the area thereof to be joined, the material and the interfed adhesive is then concurrently compressed and subjected to radio frequency heating energy whereby the adhesive melts and covers the sheet areas to be joined. The adhesive hardens as the material advances beyond the vicinity of the radio frequency field and is rewound on a take-up roll.

10 Claims, 3 Drawing Figures

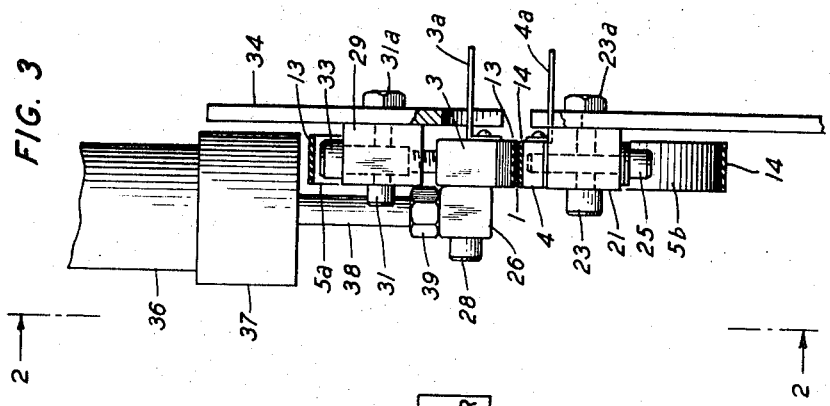
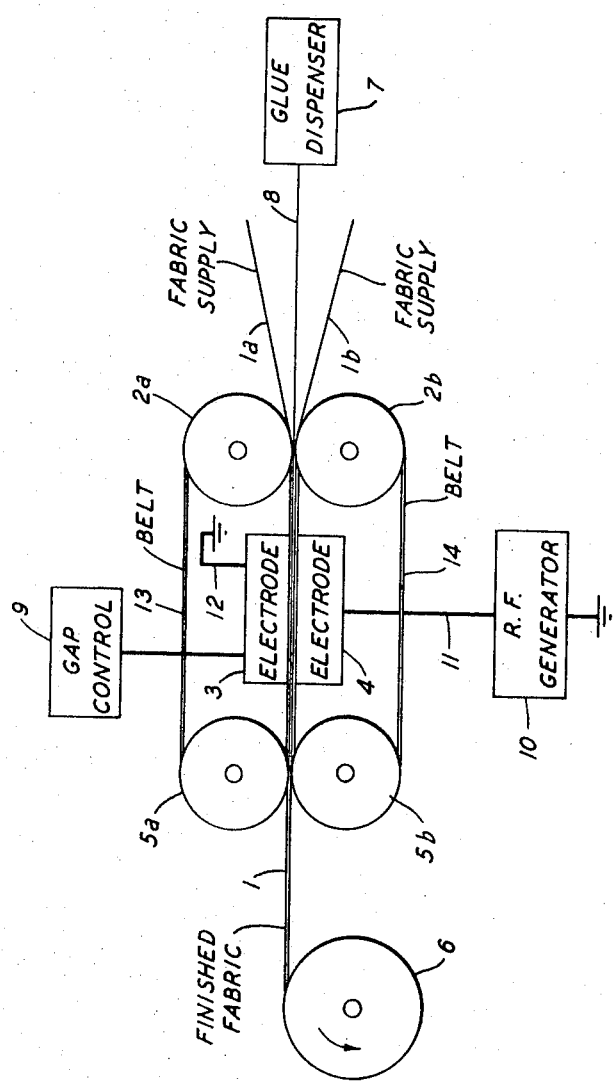

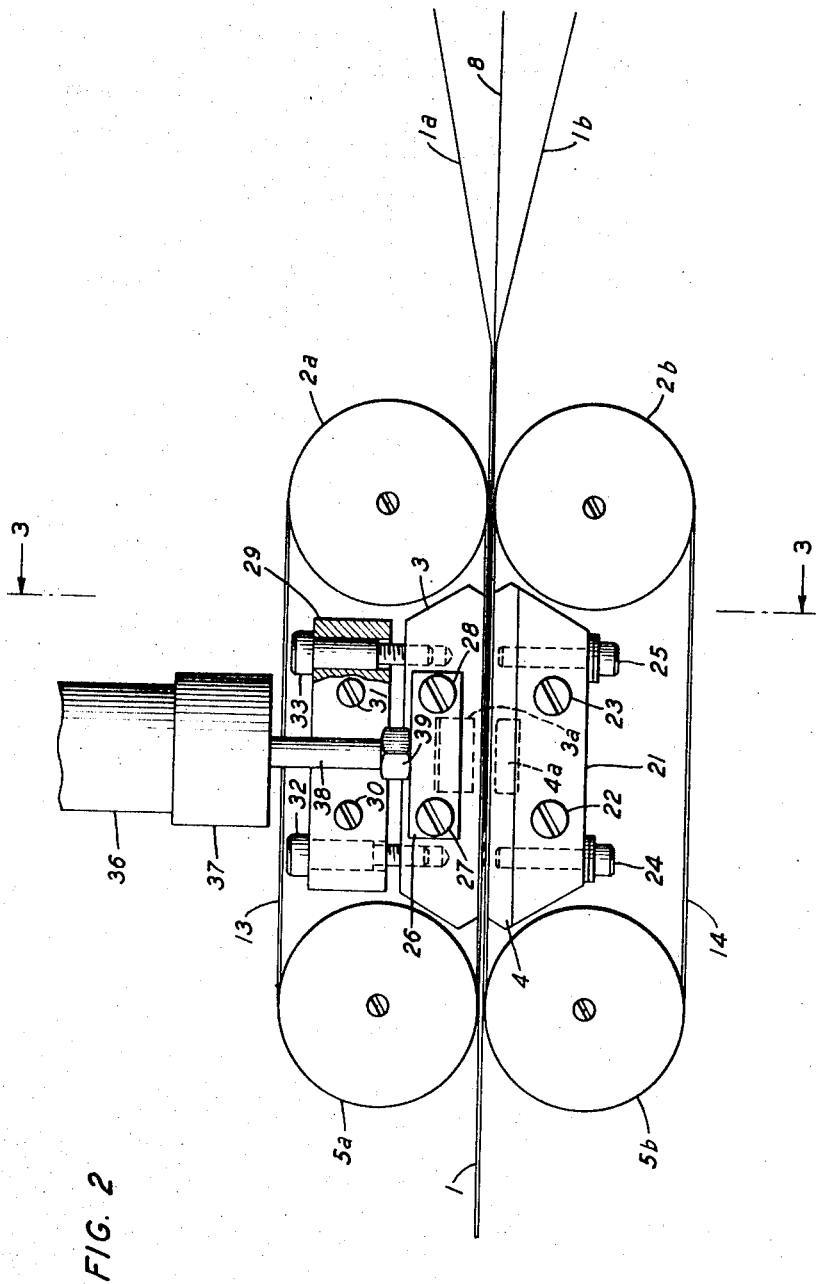

APPARATUS FOR JOINING SHEET MATERIAL

This is a division of application Ser. No. 653,787, filed July 17, 1967 now U.S. Pat. No. 3,575,760 issued Apr. 20, 1971.

The present invention relates to a method and apparatus for joining together sheets of material. In particular, this invention relates to the joining of materials with a thermo-active adhesive which is inserted between the materials to be joined, thermally activated, and compressed to form a permanent bond between the joined materials.

Many sheet materials are, for practical reasons, manufactured in narrow widths, i.e., 5 to 10 feet, and subsequently formed into sheets of greater widths by subjecting the narrow sheets to one or more edge joining operations in which the narrow sheets are placed side by side with a slight edge overlap, and the overlapped edges then joined with a suitable adhesive. Alternatively, the narrow sheets may be placed one over the other and then edge joined with the application of an adhesive to the inner surfaces along the edge portions thereof to be joined.

A variety of procedures are taught by the prior art for applying glue to the edges of material to be joined and by then activating or drying the glue to form a permanent seal. Thus, it is known to (1) coat the surfaces to be joined with a dry glue and then thermally activate the glue during the joining operation; (2) coat the surfaces with a wet glue immediately prior to the joining operation and then shortly thereafter thermally dry the glue during the joining operation; (3) insert a thread or bead of hot extruded glue between the sheet edges and then compressing the edge areas during the joining operation.

Although the foregoing expedients are reasonably effective for certain purposes, each is subject to one or more disadvantages which renders it unacceptable for many purposes. For example, it is undesirable to subject certain materials to the heat required for use with thermally active adhesive. It is difficult in many instances to apply wet adhesives with precision to certain materials so that runs do not occur. It is often difficult and undesirable to accommodate the equipment required for use with the extrusion of hot glue.

It is an object of the invention to provide a new and improved method of and apparatus for joining sheets of material. It is a further object to edge join sheets of material to form resulting sheets of greater width.

In accordance with the illustrated embodiment of the invention, sheets of material to be joined are unwound from separate supply rolls and fed into a superposed or overlapping relationship wherein the edge of one sheet overlaps a corresponding portion of the sheet to which it is to be joined. As the two sheets are so positioned, a thread of dry monofilament thermally active glue is fed from a supply chamber and interfed between the two sheets, parallel to and intermediate the edges to be joined. The glue and the edges are then fed to apparatus which concurrently compresses together the edges and subjects them to the field developed by radio frequency heating apparatus. This melts the glue and causes it to flow over the width of the overlapped edges. The advance of the sheet material is continued, the material with the melted glue advances beyond the influence of the radio frequency field, the glue immediately dries and hardens, and forms a strong unitary joint in the area defined by the overlapped edges.

A feature of the invention is the provision of equipment for joining overlapped or superposed sheet edges by inserting dry glue therebetween and by then concurrently heating the glue with a radio frequency field while maintaining a compressive force on the edges and the glue during the time they are subjected to the radio frequency field.

These and other objects and features of the invention will become apparent from a reading of the following illustrative embodiment of the invention taken in conjunction with the drawings in which:

FIG. 1 is a schematic front view of apparatus embodying the invention;

FIG. 2 is a front view illustrating the structural details of the apparatus of FIG. 1;

FIG. 3 is an end view substantially along the line 3—3 of FIG. 2.

With reference to FIG. 1, and in accordance with the invention, separate and relatively narrow sheets of material $1a$ and $1b$ are withdrawn from individual supply rolls (not shown), advanced to the left between rolls $2a$ and $2b$, between electrodes 3 and 4, between rolls $5a$ and $5b$, and then rewound as joined sheets 1 on finish roll 6. A glue dispenser 7 supplies a dry monofilament glue 8 which is positioned intermediate the edge portions of sheets $1a$ and $1b$ that are to be joined. By means of a piece of tape, for example, the leading end of glue 8 is affixed to the edge portion of either sheet $1a$ or $1b$ so that the glue remains between the edges to be joined and is interfed therebetween as the sheets advance to the left with reference to FIG. 1. The rolls $2a$ and $2b$, by means of their spaced apart distance, initially compress the filament of glue 8 between the edges of sheets $1a$ and $1b$. The sheet edges and the glue then pass, with the assistance of belts 13 and 14, between electrodes 3 and 4 which further compresses them with a force determined by gap control 9. Belt 13 passes between the electrodes and around the outer surfaces of rollers $2a$ and $5a$. Belt 14 passes under belt 13, between the electrodes, and around rollers $2b$ and $5b$. Advantageously, the belts may be of any suitable material and coated with a substance such as Teflon.

Electrode 4 is connected by conductor 11 to the ungrounded output of radio frequency generator 10. Electrode 3 is grounded via conductor 12. The resulting radio frequency field between the electrode melts the filament of glue and the compressive force applied by the electrode causes the melted glue to flow and cover the edges to be joined. The melted film of glue dries almost immediately and forms a permanent bond when the sheets $1a$ and $1b$ continue their leftward travel and pass beyond electrodes 3 and 4. The edge joined sheets 1 then pass between cylinders $5a$ and $5b$ and are rerolled on finish roll 6.

The sheets $1a$ and $1b$ may be positioned by their supply rolls in a side by side overlapping edge relationship and then glued in the manner described if it is desired to have the width of the joined sheets 1 as taken upon finish roll 6 be equal to the sum of the width of individual sheets $1a$ and $1b$.

Alternatively, the sheets $1a$ and $1b$ may be positioned one on top of the other, joined on their edge that passes between the electrodes, passed between rolls $5a$ and $5b$, and rerolled on finish roll 6 so that the width of the finish sheet 1 is not greater than that of either of sheets $1a$ or $1b$. In this case, the finish sheet 1 may subsequently be unfolded to form a wider sheet when removed from roll 6.

FIG. 1 discloses the glue dispenser 7 as being a considerable distance from rollers $2a$ and $2b$. In practice, the dispenser 7 may be as close as may be desired to rollers $2a$ and $2b$.

The apparatus shown schematically in FIG. 1 and embodying our invention is shown in detail in FIGS. 2 and 3. FIG. 2 is a front view of the rollers, the electrodes, and the electrode supporting structure. FIG. 3 is an end view taken along line 3—3 of FIG. 2. As described with reference to FIG. 1, FIG. 2 shows sheet material $1a$ and $1b$ to be withdrawn from supply rolls (not shown), interfed with a filament adhesive 8 passed between rolls $2a$ and $2b$, electrodes 3 and 4, between rolls $5a$ and $5b$ after which the joined sheets 1 are taken up on finish roll 6 (not shown on FIG. 2).

With reference to FIGS. 2 and 3, electrode 4 is affixed to a lower block member 21 by means of machine screws 24 and 25. The block member 21 is, in turn, affixed by means of screws 22 and 23 and nuts $22a$ and $23a$ to a vertical side plate 34 (FIG. 3). A terminal $4a$ is shown affixed to electrode 4 in order to provide for the attachment of conductor 11 from radio frequency generator 10.

An upper block member 29 is fixably attached to plate 34 by means of screws 30 and 31 and nuts $30a$ and $31a$. Block 29 is drilled to movably receive screws 32 and 33 which have an upper unthreaded portion $32a$ and $33a$ and a lower threaded portion $32b$ and $33b$, respectively. Electrode 3 is suitably tapped to receive screw threads $32b$ and $33b$. Since screws 32 and 33 are movably attached to block 29 and fixably attached to electrode 3, it may be appreciated that the electrode is vertically movable with respect to block 29 which, as already mentioned, is fixed to plate 34.

A block member 26 (FIG. 3) is attached by means of screws 27 and 28 to the front of electrode 3. A downward force (with respect to FIGS. 2 and 3) is maintained on the upper surface of block 26 by means of a nut 39 which is attached to the lower end of cylindrical rod 38. Rod 38 extends into the lower end of cylinder 36 having a lower portion 37. The cylinder maintains an adjustably controlled downward force on rod 38 by means of either a spring (not shown) within the cylinder or a source of compressed air (not shown) applied to the cylinder.

The downward force applied to block 26 urges electrode 3 downwards. The downward travel of the electrode may be controlled by adjustments of screws 32 and 33. An increased clockwise adjustment of the screws causes its threads 32b and 33b to enter further into the electrode. This causes the electrode to rise and decrease the limit to which it may be urged downward by cylinder rod 38 and nut 39. Conversely, a counterclockwise rotation of screws 32 and 33 increase the limit of downward travel of the electrode.

Terminal 3a is attached to electrode 3 and provides a means for attached it to grounding conductor 12.

The Teflon coated belt 13 is mounted on the outer surface of rolls 2a and 5b and its lower portion is positioned intermediate electrodes 3 and 4. Similarly, belt 14 is mounted on rolls 2b and 5b and its upper portion is intermediate the electrodes and under belt 13. Belts 13 and 14 facilitate the passage of sheets 1a and 1b and glue 8 leftward from rollers 2a and 2b, between the electrodes, through rollers 5a and 5b and then onto a finish roll.

The gap adjusting screws 32 and 33 and cylinder 36 provide means for adjusting the electrode gap for various materials and for maintaining the desired pressure on the heated glue and the sheet areas that are to be joined as they pass between the electrodes and are subject to the heating influence of the radio frequency field.

It thus may be seen from the foregoing that our invention provides for an improved method and apparatus for joining material. It is particularly an improvement over the prior art in that the radio frequency heating apparatus limits its heating effect to the filament adhesive and minimizes a heating of sheet material 1a and 1b. Because of this, our invention is ideally suited for joining heat sensitive material that cannot tolerate the temperatures required with thermally activated adhesive joining apparatus of the prior art.

It is understood that the above-described arrangements are merely illustrative of the application of the principles of the invention. Numerous other arrangements may be devised by those skilled in the art without departing from the spirit and scope of the invention.

What is claimed is:

1. Apparatus for joining fabric comprising:
   fabric feeding means for continuously feeding first and second portions of fabric along a path to provide face-to-face contact between said portions of fabric along a portion of said path,
   a dry adhesive in thread form, said adhesive being responsive to electromagnetic energy to provide heat in response thereto,
   adhesive feeding means for simultaneously and continuously interfeeding between said portions of fabric said dry adhesive thread along said portion of said path,
   heating means along said portion of said path to provide electromagnetic energy to said thread for heating said adhesive thread without substantially heating said fabric, said heating means being deployed to provide heat along substantially all of said portion of said path, and
   pressure means along said portion of said path for applying compressive pressure between said first and said second portions of fabric, said pressure means being deployed to provide pressure along substantially all of said portion of said path while heat is being applied,
   the magnitude of the heat and pressure applied by said heating means and said pressure means being great enough to cause said heated adhesive to flow sufficiently to join together said fabric portions in a line.

2. The fabric joining apparatus of claim 1 wherein said pressure means comprises:
   a first member having a substantially flat first surface,
   a second member having a substantially flat second surface parallel to and spaced apart from said first surface of said first member,
   said portions of fabric passing between said first and second surfaces, and
   means for controlling the spaced apart distance between said members.

3. The fabric joining apparatus of claim 1 wherein said heating means comprises:
   an electrode included within said pressure means, and
   means for applying radio frequency energy to said electrode to heat the dry adhesive thread being fed between said portions of fabric.

4. The fabric joining apparatus of claim 2 wherein said heating means comprises:
   a first electrode included within said first member and a second electrode included within said second member and,
   means for applying radio frequency energy to said electrodes to heat said dry adhesive thread being fed between said portions of fabric.

5. The fabric joining apparatus of claim 2 wherein said heating means comprises:
   a source of radio frequency energy connected between said first and second members.

6. The fabric joining apparatus of claim 1 wherein said fabric feeding means comprises:
   a first belt for carrying said first portion of fabric along said path, and
   a second belt for carrying said second portion of fabric along said path.

7. The fabric joining apparatus of claim 2 wherein said fabric feeding means comprises:
   a first belt for carrying said first portion of fabric along said path, and
   a second belt for carrying said second portion of fabric along said path.

8. The fabric joining apparatus of claim 3 wherein said fabric feeding means comprises:
   a first belt for carrying said first portion of fabric along said path, and
   a second belt for carrying said second portion of fabric along said path.

9. The fabric joining apparatus of claim 4 wherein said fabric feeding means comprises:
   a first belt for carrying said first portion of fabric along said path, and
   a second belt for carrying said second portion of fabric along said path 10. The fabric joining apparatus of claim 5 wherein said fabric feeding means comprises:
    a first belt for carrying said first portion of fabric along said path, and
    a second belt for carrying said second portion of fabric along said path.

* * * * *